United States Patent [19]
Carter et al.

[11] 3,986,084
[45] Oct. 12, 1976

[54] UNIVERSAL FEED THROUGH CAPACITOR

[75] Inventors: Donald J. Carter, Ortonville; Garry S. Hoffman, Royal Oak; Thomas M. Smith, Detroit, all of Mich.

[73] Assignee: Little Manufacturing Company, Troy, Mich.

[22] Filed: July 17, 1975

[21] Appl. No.: 596,761

[52] U.S. Cl. ........................... 317/260; 317/242
[51] Int. Cl.$^2$ ........................................ H01G 4/42
[58] Field of Search ............ 317/246, 260; 339/205; 333/79 R

[56] References Cited
UNITED STATES PATENTS

| | | | |
|---|---|---|---|
| 1,324,792 | 12/1919 | Booth | 317/260 |
| 1,942,153 | 1/1934 | Seeley | 317/260 X |
| 2,782,247 | 2/1957 | Bales | 317/260 |
| 3,081,443 | 3/1963 | Trinen | 339/205 |
| 3,181,044 | 4/1965 | Duncan | 317/242 |
| 3,683,244 | 8/1972 | Kitamura | 317/242 |
| 3,878,441 | 4/1975 | Skinner | 317/242 |

FOREIGN PATENTS OR APPLICATIONS

| | | | |
|---|---|---|---|
| 123,698 | 3/1947 | Australia | 317/260 |
| 207,267 | 1/1940 | Switzerland | 317/242 |

Primary Examiner—E. A. Goldberg
Attorney, Agent, or Firm—Cullen, Settle, Sloman & Cantor

[57] ABSTRACT

An improved feed through capacitor for radio frequency suppression adapted for universal connection between a source of supply and each utilization device in a vehicle. A conventional capacitive winding is encapsulated in a non-conductive container. A rigid conductive blade having opposite male and female ends of the plug-in type extends through the winding and into the encapsulated container. The male end emerges from the encapsulated container at one end thereof and the female end terminates electrically accessible of the encapsulating material at the other end thereof. A flexible grounding lead is connected to the conventional winding and extends through the encapsulation and outwardly therefrom. The blade supports the entire encapsulated capacitor for universal mounting.

5 Claims, 5 Drawing Figures

UNIVERSAL FEED THROUGH CAPACITOR

BACKGROUND OF THE INVENTION

This invention relates to an improvement in a feed through capacitor for radio frequency suppression in an automobile.

In automobiles, the use of a radio frequency suppression capacitor is, of course, well known. Typically, a plurality of such capcaitors are utilized. For each capacitor, one end is connected to the source of supply such as the electrical harness and the other end is connected to a utilization device, such as a tailgate switch, blower motor, window wiper motor, power window motor, etc.

In the use of these feed through capacitors, one significant problem is the need for a specially configured and designed capacitor for each utilization device. typically, the conventional capacitor windings are encapsulated in a metal container to which a combined grounding and mounting bracket is attached, such as by spot welding. Thus, for each utilization, a different configuration of the grounding and mounting bracket is required.

Because of the different configuration of each mounting and grounding bracket, these radio frequency suppression cpacitors are typically manufactured with flexible wire leads at the input and the output ends. The ends of the leads have connecting terminals for connection at the input end to the source of supply and at the output end to the utilization device.

Thus, a single automobile may require 15 or 20 different configurations and styles of the feed-through capacitor.

Yet another problem with the prior art capacitor is that the metal container itself, as well as the metallic grounding and mounting bracket, frequently corrode to open the grounding circuit. Furthermore, the metal container often provides for accidental grounding of other circuits.

Hence, the invention herein is directed to a universal feed-through capacitor for radio frequency suppression in an automobile which eliminates the above problems and which may be conveniently utilized in all the various circuits of an automobile.

SUMMARY OF THE INVENTION

The present invention of a universally mountable feed-through capacitor includes a single substantially rigid metal blade having male and female ends for connection in the electrical circuitry. The conventional winding is encapsulated in a non-conductive material. A grounding wire or lead is connected to the conventional winding and extends outwardly through the encapsulating material. The grounding lead is flexible and is attached to a convenient portion of the automobile by a conventional fastener, such as a screw. The elongated blade, having male and female ends, not only provides the input and output connection for the capacitor, but also provides the function of the mounting and supporting bracket without the attendant disadvantages described previously.

BRIEF DESCRIPTION OF THE DRAWINGS

The foregoing advantages of the present invention, together with other objects and advantages which may be attained by its use, will become more apparent upon reading the following detailed description, taken in conjunction with the drawings.

In the drawings, wherein, like reference numerals identify corresponding components.

DETAILED DESCRIPTION OF THE INVENTION

Figure 1:
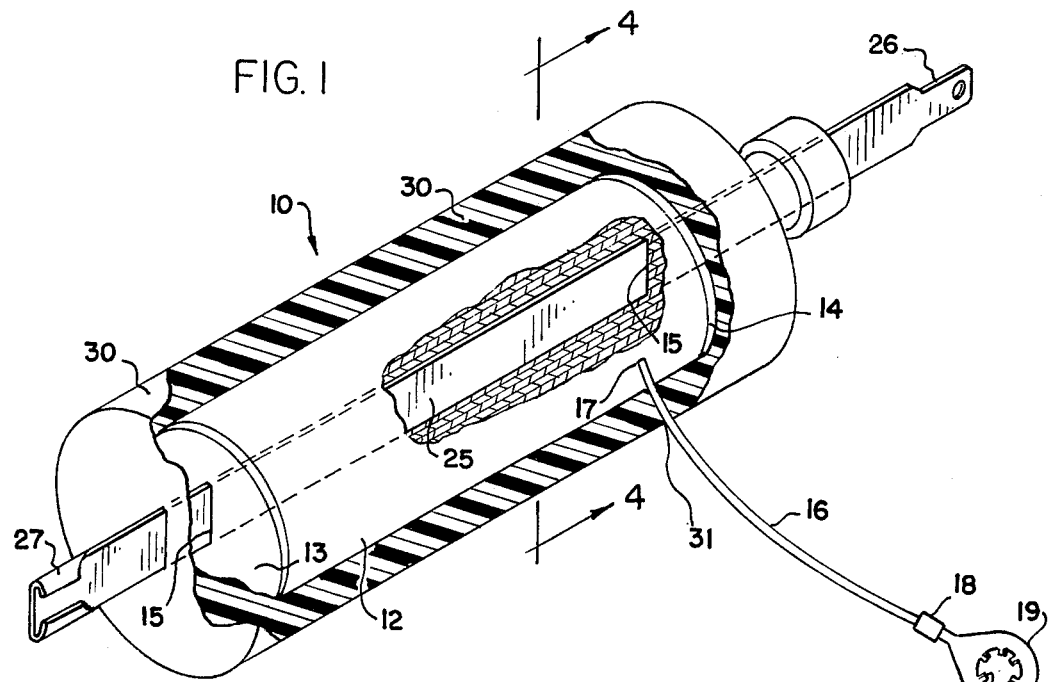
FIG. 1 is a perspective illustration, partly broken away, of the improved capacitor according to the principles of the present invention.

As illustrated in the drawings, the improved feed-through capacitor 10 of the present invention includes a conventional capacitive winding 12 and a metallic washer 13,14 at each end. Each washer includes a rectangular slot 15 therethrough.

A flexible grounding lead 16 has its first end welded as at 17 to one of the washers 14. The free end 18 of the flexible grounding lead 16 is connected to a flat terminal 19 having a toothed aperture 20. The insertion of a screw through the toothed aperture 20 permits the capacitor to be grounded to a metallic part of the automobile.

In order to mount and support the capacitor 10 and to provide connections to the electrical circuit, the present invention includes an elongated metallic blade 25 which extends through each slot 15 in each washer 13,14 and through the winding 12. The opposite ends of the blade 25 include a male end 26 and a female end 27 for plug-in type interconnection to the electrical circuitry.

The winding 12 and the washers 13 and 14 (and, of course, the intermediate portion of the blade 25) are totally encapsulated within a nonconductive material 30 which is preferably an injection molded plastic or vinyl.

When the capacitor is assembled and encapsulated, the blade 25 provides a rigid support for the winding 12 and the washers 13,14 as well as for the encasulating materials 30. The flexible grounding lead 16 emerges from the encapsulating material as at 31 to be conveniently grounded when the capacitor is installed in an automobile. The use of an insulating or nonconducting material for encapsulation prevents possible shorting of the capacitor or of other circuits to the capacitor. Similarly, the rigid blade instead of wire leads reduces corrosion, and the flexible grounding lead, secured to a washer internally of the encapsulation and then extending within the encapsulation a short distance prior to emerging therefrom eliminates the problems of corrosion at the junction of the grounding lead and the winding.

In the embodiment of FIG. 1, the female end 27 terminates free of the encapsulating material 30 by extending outwardly therefrom.

Figure 2:
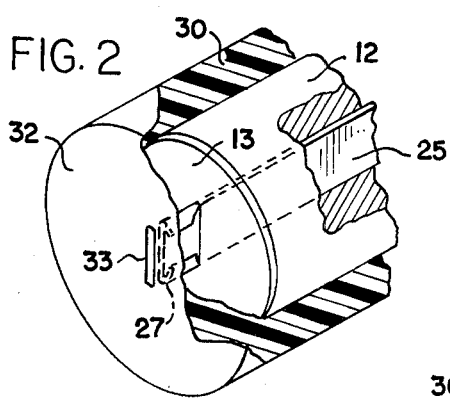
FIG. 2 is a partial perspective illustration of another embodiment of the present invention.

In FIG. 2, the female end 27 is recessed inwardly from the end 32 of the capacitor 10 and a slot 33 is provided at the end 32 of the capacitor. This slot provides access to the female end 27 of the blade for subsequent insertion of a male plug. Hence, the female end of the blade, by virtue of slot 33, terminates electrically accessible relative to the encapsulating material.

Figure 3:
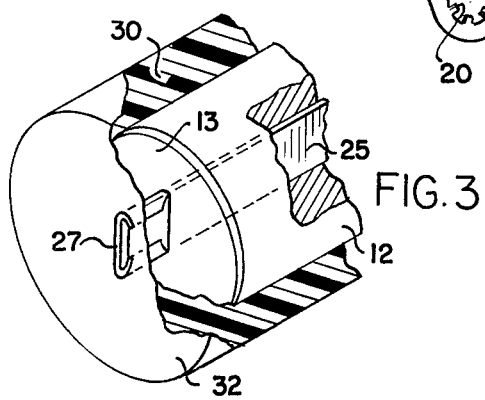
FIG. 3 is a partial perspective illustration of yet another embodiment of the present invention.
Figure 4:
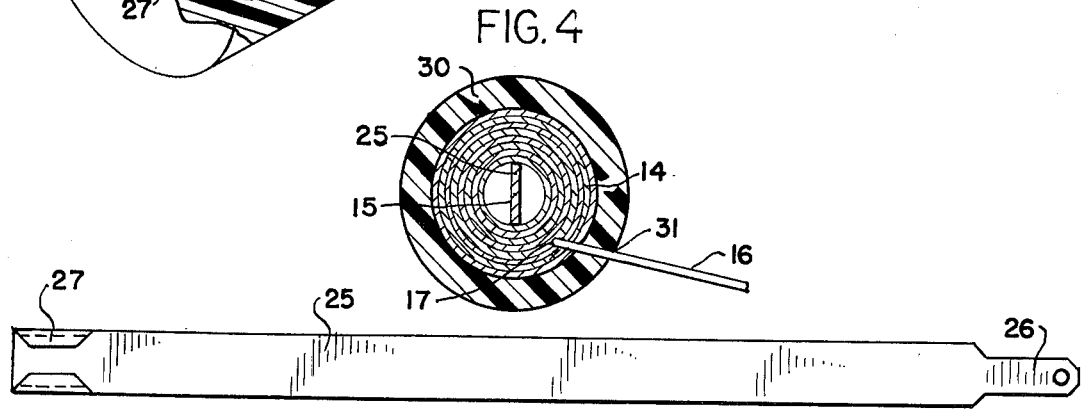
FIG. 4 is an illustration as seen in the plane of arrows 4—4 of FIG. 1.
Figure 5:
FIG. 5 is a front elevational view of the blade of the present invention.

In the embodiment of FIG. 3, the female end 27 is flush with the end 32 of the capacitor and is, thus, electrically accessible relative to the encapsulating material 30.

The foregoing is a complete description of the preferred embodiment of the present invention. Various changes and modifications may be made without departing from the spirit and scope of the present invention.

What is claimed is:

1. In a feed-through capacitor having a conventional winding of the type for radio frequency supression, the improvement comprising:
    an elongated flat rigid conductive blade extending through said winding;
    said blade having a male end and a female end externally of said winding and at opposite ends thereof;
    a flexible conductive grounding lead connected to one end of said winding and having a free opposite end; and
    said winding, said blade and said flexible conductive lead being encapsulated in a non-conductive material with the male blade end and female blade end and free end of said flexible conductive lead all electrically accessible relative to said encapsulation; said conductive blade for electrically interconnecting said capacitor in a circuit and for rigidly supporting said capacitor.

2. The invention as defined in claim 1 and further including a metallic washer at each end of said conventional winding;
    said washer having a slot therein and said blade extending through the slot in each washer; and
    said flexible conductive lead being connected to one of said washers.

3. The invention as defined in claim 1 wherein, said male blade end and said femle blade end and said flexible conductive lead all extend outwardly free of said encapsulation.

4. The invention as defined in claim 1 wherein, said male blade end and said flexible conductive lead extend outwardly of said encapsulation and said female blade end is flush with the end of said encapsulation.

5. The invention as defined in claim 1 wherein, said male blade end and said flexible conductive lead extend outwardly of said encapsulatin and said female blade end is recessed inwardly from the end of said encapsulation, said encapsulation being open to provide electrical access to said female blade end.

* * * * *